United States Patent [19]

Lin

[11] Patent Number: 5,634,276
[45] Date of Patent: Jun. 3, 1997

[54] HIGH BRANCH PRUNING SHEARS STRUCTURE

[75] Inventor: Chu-Lan Lin, Changhua, Taiwan

[73] Assignee: Shang Gu Enterprise Co., Ltd., Changhua, Taiwan

[21] Appl. No.: 442,694

[22] Filed: May 17, 1995

[51] Int. Cl.⁶ ................................................. B26B 13/06
[52] U.S. Cl. ................................. 30/249; 30/166.3
[58] Field of Search ........................... 30/166.3, 146, 30/244, 245, 246, 249

[56] References Cited

U.S. PATENT DOCUMENTS

| | | | |
|---|---|---|---|
| 3,360,858 | 1/1968 | Cowley | 30/249 |
| 3,835,535 | 9/1974 | Robison et al. | 30/249 |
| 4,760,645 | 8/1988 | Davis | 30/249 |
| 4,976,031 | 12/1990 | Miller | 30/166.3 |
| 5,241,752 | 9/1993 | Lutzke et al. | 30/249 |

*Primary Examiner*—Hwei-Siu Payer
*Attorney, Agent, or Firm*—Beveridge, DeGrandi, Weilacher & Young, L.L.P.

[57] ABSTRACT

The invention herein relates to kind of improved structure high branch pruning shears that is structurally comprised mainly of the shears, a convex blade, a pull rod, an adjustment rod, a handle mount, a saw blade, and a pull rope. The handle mount is installed at the lower end of the shears and at the lower section of the handle mount is a roller wheel ensconced in an U-shaped component. The convex blade is hinged to the shears and is supported in operation by the concave blade. There is a fastening pin on the concave blade provided for the installation of the saw blade. One end of the aforesaid concave blade is utilized as a conjoinment and pivot point inside the slide slot of the pull rod and the front end of the pull rod is riveted to the shears with a recoil spring seated on the fastening rivet. One end of the pull role is guyed to the U-shaped component and then routed through the roller wheels of the handle mount and the adjustment rod, respectively, such that as the pull rope is dram downward, the adjustment rod is subjected to a downward force that causes the movement of the pull rod and initiates the pivoting of the convex blade. When a coarse tree branch is encountered the adjustment rod slides into the next lower notch hole to achieve a greater shearing force and thereby effectively maximizes pruning efficiency, resulting in a pruning tool that requires minimum physical effort.

7 Claims, 6 Drawing Sheets

HIGH BRANCH PRUNING SHEARS STRUCTURE

BACKGROUND OF THE INVENTION

The invention herein consists of an improved structure high branch pruning shears that is structurally comprised of a positioner mount, a concave blade, a pull rod, a connecting rod, an adjustment rod, a hinge base, roller wheels, pull rope and other major components, such that the invention herein achieves the objective of enabling the user to obtain significantly greater pruning force while exerting minimal physical effort when pruning trees (branches).

When high branch pruning shears are utilized on fruit orchard and other trees, a kind of pruning tool is required to trim the leaves and branches of the taller trees. However, as indicated in FIG. 1, the structure of conventional high branch pruning shears consists of:

A positioner mount (10) at the rear end of a hinge base (11) that enables the hinge based (11) to be sturdily conjoined to an extension rod (P) at a hooked ring (9) at the posterior extent of the hinge base (11), and the rear end is curved to form a concave blade (13) with a hole a suitable distance away at the upper extent and a tab (15) protruding from the middle section, as well as a convex blade (17) conjoined at the lower extent of a pull rod (16) and the hinge base (18) on the hole and, furthermore, conjoined to the lower extent of the aforesaid hinge base (18) and the center of the tab (15) is a leaf spring (19), and conjoined to the upper end of the pull rod (16) is a roller wheel (14), and the lower end of the roller wheel (14) is conjoined to pull rope (8) that enables, after the pull rope (8) is inserted through the hooked ring (9) past the roller wheel (14), the aforesaid pull rope (8) to be inserted into and fastened to a knobbed handle (7) and thereby constitute a high branch pruning shears; when such high branch pruning shears are utilized to prune tree branches, the concave blade (13) is first positioned around the tree branch to be pruned and the pull rope (8) is tugged downward to cause the pull rod (16) to move the convex blade (17) towards the concave blade (13) to perform the pruning and after the pruning of the tree branch is completed, the leaf spring (19) in between the hinge base (18) and the tab (15) pushes the convex blade (17) back to the original position, however, when a conventional high branch pruning shear is utilized, numerous shortcomings and inconveniences frequently occur and the aforesaid shortcomings include the following:

An unusually high degree of force is required since the pull rope (8) must be tugged downward to cause the pull rod (16) to move the convex blade (17) towards the concave blade (13) for the execution of the pruning action, which necessitates a great deal of energy when pruning and, furthermore, when a coarse tree branch is to be pruned, an even greater magnitude of force is required to prune the tree branch.

The shape of the leaf spring is easily deformed because when the pull rod (16) moves the convex blade (17) to execute the pruning action, a bend is produced in the leaf spring (19) and since the leaf spring (19) provides the convex blade (17) with a functional means of returning to the original position, the leaf spring (19) is easily deformed due to periodic subjection to bending over a given span of time, wherein the resilient returning function of the convex blade (17) gradually deteriorates.

The hinge base easily separates from the extension rod, a phenomenon that is attributed to the necessity of inserting the extension rod (P) into the hinge base (11), wherein there is an opening in the hinge base (11) to accommodate the insertion and screw fastening of the extension rod (P) such that when a tree branch of inordinate height is pruned and after the concave blade (13) is positioned over the tree branch to be pruned, the hinge base (11) is frequently loosened from the extension rod (P) and ultimately fails off entirely.

The pull rope cannot be effectively adjusted because after the trailing end of the pull rope (8) is inserted into the knobbed handle (7) and tied into a knot for fastening onto the knobbed handle (7), when the pruning of a high tree branch is performed, the aforesaid pull rope (8) has to be of a certain predetermined length to achieve an effective pruning force, wherein it is often the case that the length of the pull rope (8) must be increased when encountering a tree branch of relatively low height, otherwise, it will be impossible to exert tension on the pull rope (8) with the knobbed handle (7) alone such that the pull rope must be coiled to achieve the length appropriate to exert tension, thereby precluding the utilization of the additional leverage offered by the knobbed handle (7) due to the impossibility of length adjustment.

Therefore, the inventor of the invention herein has engaged in the manufacturing and development of high branch pruning shears for many years and applied the resulting experience to overcome the numerous aforementioned disadvantages and inefficiencies characteristic of conventional high branch pruning shears by innovatively improving the aforesaid structure, wherein following concentrated research, prototype construction and experimentation, the improved structure high branch pruning shears of the invention herein was perfected and in accordance with the relevant laws, the application for the commensurate patent rights was duly submitted, wherein:

The primary objective of the invention herein is to provide a kind of improved structure high branch pruning shears that is structurally comprised of the shears, a concave blade, a pull rod, an adjustment rod, a handle mount, a saw blade, a pull rope and other major components, including:

The shears, of which one side consists of a concave blade and at an appropriate distance from the rear extent of the concave blade is an insertion hole and to the rear of the aforesaid insertion hole is a through-hole; there is a positioner pin riveted below the aforesaid through-hole and a fastening pin is riveted a suitable distance from the upper extent of the aforesaid concave blade, and there is a screw hole at the side of the aforesaid fastening pin. Furthermore, at the lower end of the aforesaid shears is a hinge hole for a screw fastening the handle mount.

A convex blade that has two insertion holes at the middle and the lower end, respectively, wherein the aforesaid insertion hole at the middle is aligned with the aforesaid insertion hole of the aforesaid shears to form a pivot point and the aforesaid insertion hole at the lower end supports conjoinment into the slide slot of a pull rod.

A pull rod that has an insertion hole at the front end to support a recoil spring and a rivet in the insertion hole on the sheers and, furthermore, there is a slide slot centered a suitable distance away on the front end and an adjustment slot is centered a suitable distance away on the rear end, with the adjustment slot provided with a number of notch holes to facilitate incremental adjustment.

An adjustment rod that consists of a length of U-shaped metal stock with an insertion hole at the front end a suitable distance away, and at the tip of the front end is an opening and, furthermore, a positioner pin is conjoined to the adjustment slot of the pull rod for positioning into notch holes and, furthermore, a U-shape strip at the trailing end ensconces a roller wheel that is aligned with an insertion hole to enable rotation.

A handle mount that has a hinge conjoinment hole centered on the end section which is fastened by threads to the lower end of the sheers and around the circumference at one side is a grip section having wave-like contours, while at the end section of the opposite side is U-shaped component ensconcing a roller wheel and, furthermore, an extension rod is attached to the aforesaid end section.

A pull handle that consists of a columnar rod having the two insertion holes drilled through at appropriate points in the center proximity, wherein the insertion holes are provided for the insertion and fastening of a pull rope to thereby facilitate the free adjustment of rope length.

A pull rope, of which one end is firmly guyed to the U-shaped adjustment rod and then routed through and against the respective roller wheels of the handle mount and the adjustment rod, and the opposite end is inserted into the pull handle.

Based on the description of the aforesaid structural components of the invention herein, when proceeding to prune tree branches by tugging on the aforementioned pull rope, the adjustment rod can be moved in the adjustment slot within the pull rod to another of the aforementioned notch holes to achieve a greater shearing force, thereby maximizing pruning efficiency and requiring minimum physical effort.

The improved structural innovations of the invention herein are further elaborated below through the brief description of the drawings attached below which in combination with the detailed description of the invention herein following, shall serve as a reference for the examination committee. The aforesaid drawings and the respective descriptions are as follows:

DETAILED DESCRIPTION OF THE INVENTION

Figure 1:
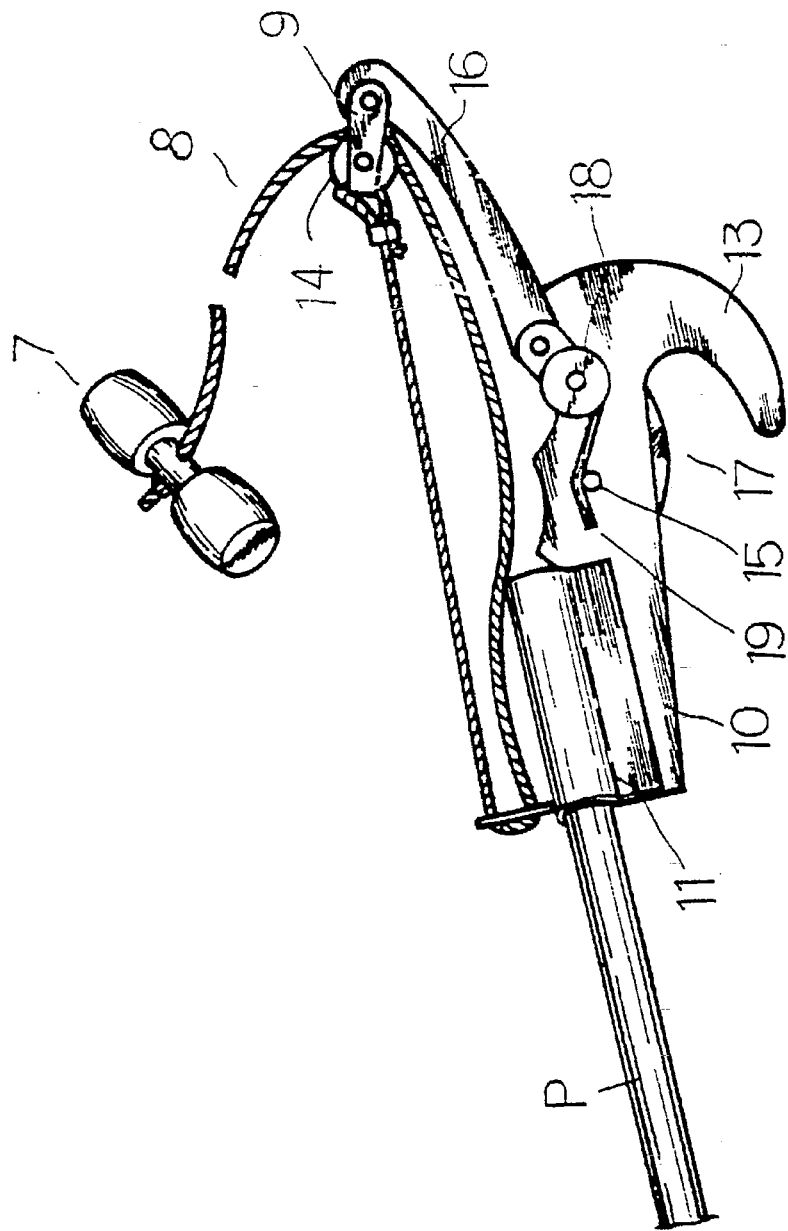
FIG. 1 is a structural drawing of a conventional high branch pruning shear.
Figure 2:
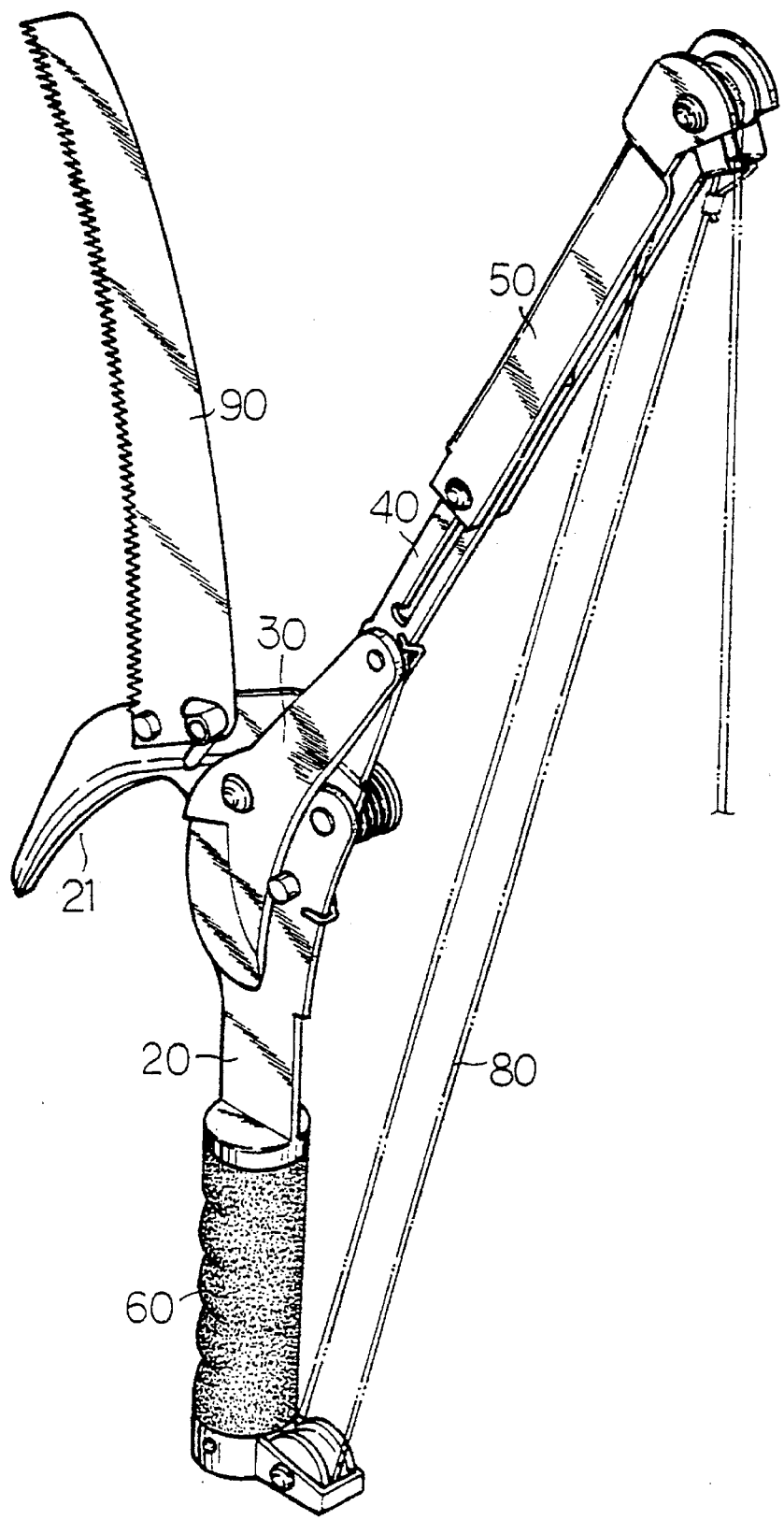
FIG. 2 is an isometric drawing of the structure of the invention herein.
Figure 3:
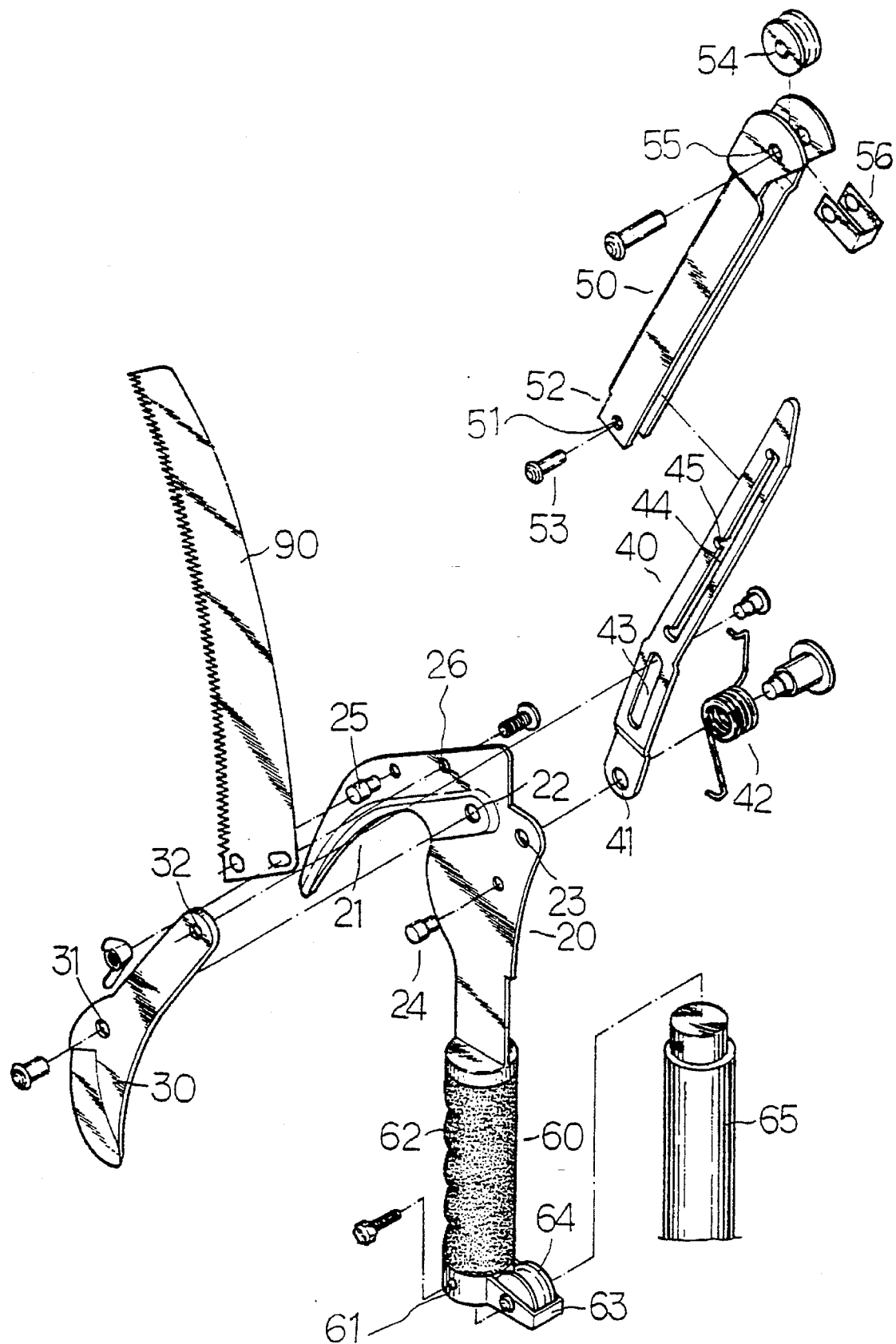
FIG. 3 is an exploded isometric drawing of the structure of the invention herein.

As indicated in FIG. 2, FIG. 3, FIG. 4, FIG. 5 and FIG. 6 and with specific reference to FIG. 2 and FIG. 3, the improved structure high pruning shears (20) of the invention herein includes:

The shears (20), of which one side consists of a concave blade (21) and at an appropriate distance from the rear extent of the concave blade (21) is an insertion hole (22) and to the rear of the aforesaid insertion hole (22) is a through-hole (23); there is a positioner pin (24) riveted below the through-hole (23) and a fastening pin (25) is riveted a suitable distance from the upper extent of the concave blade (21), and there is screw hole (26) at the side of the fastening pin (25). Furthermore, at the lower end of the shears (20) is a hinge hole (61) for screw fastening a handle mount (60) to the invention herein.

A convex blade (30) that has the insertion holes (31) and (32) at the middle and the lower end, respectively, wherein the insertion hole (31) at the middle is aligned with the insertion hole (22) of the shears (20) to form a pivot point and the insertion hole (32) at the lower end supports conjoinment into the slide slot of the pull rod (40).

A pull rod (40) that has an insertion hole (41) at the front end to support a recoil spring (42) and a rivet in the through hole (23) on the shears (20) and, furthermore, there is a slide slot (43) centered a suitable distance away on the front end and an adjustment slot (44) is centered a suitable distance away on the rear end, with the adjustment slot (44) provided with a number of notch holes (45) to facilitate incremental adjustment.

An adjustment rod (50) that consists of a length of U-shaped metal stock with an insertion hole (51) at the front end a suitable distance away, and at the tip of the front end is an opening (52) and, furthermore, a positioner pin (53) is hinged to the adjustment slot (44) of the pull rod (40) for positioning into the notch holes (45) and, furthermore, a U-shape strip (56) at the trailing end ensconces a roller wheel (54) that is aligned with the insertion hole (55) to enable rotation.

A handle mount (60) that has a hinge conjoinment hole (61) centered on the end section which is fastened by threads to the lower end of the shears (20) and around the circumference at one side is a grip section (62) having wave-like contours, while at the end section of the opposite side is a U-shaped component (63) ensconcing a roller wheel (64) and, furthermore, an extension rod (65) is attached to the aforesaid end section.

Figure 4:
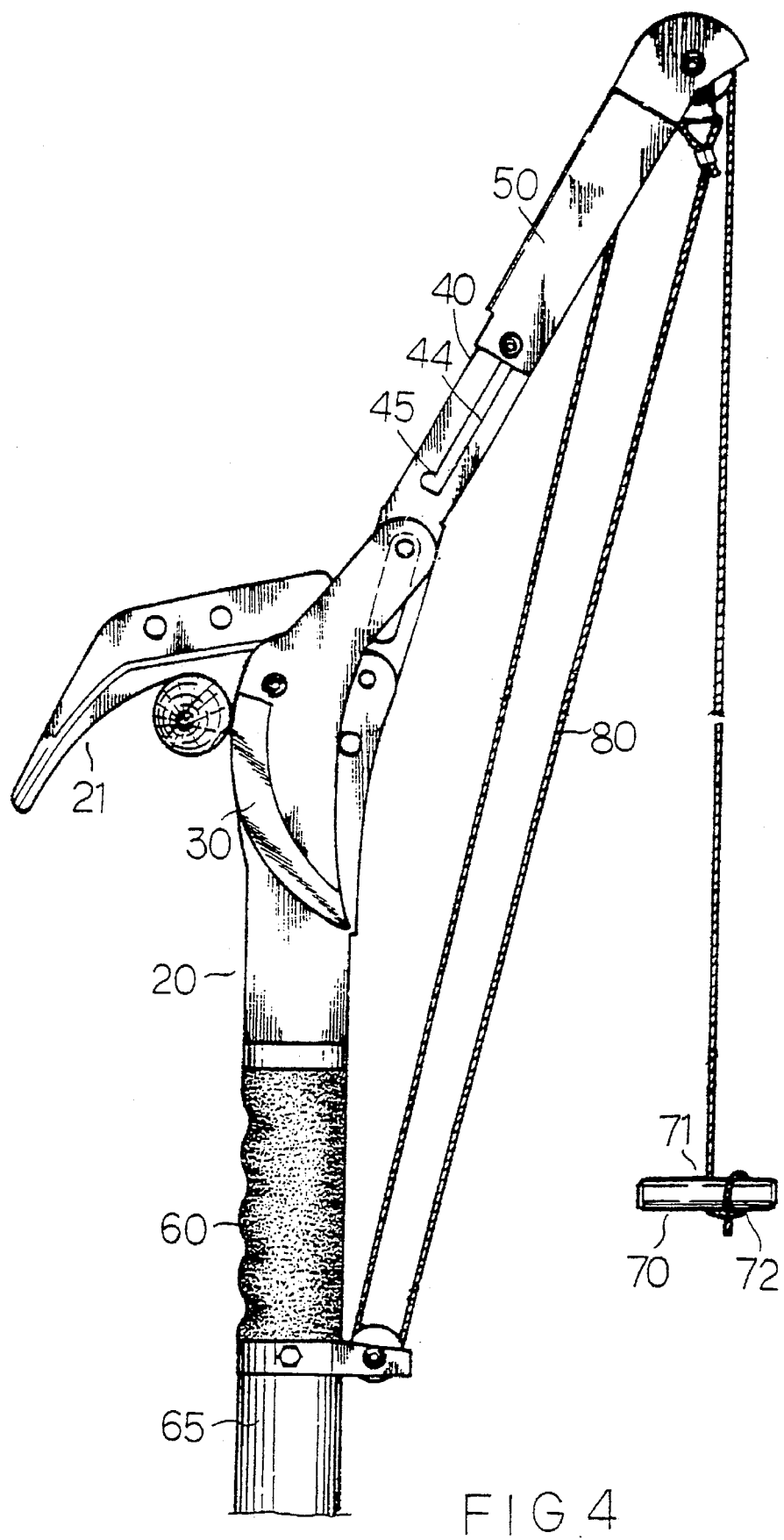
FIG. 4 is an orthographic drawing illustrating the first operational procedure in structural detail of the invention herein.

Referring now also to FIG. 4 a pull handle (70) that consists of a columnar rod having the two insertion holes (71) and (72) drilled through at appropriate points in the center proximity, wherein the insertion holes (71) and (72) are provided for the insertion and fastening of a pull rope (80) to thereby facilitate the free adjustment of rope length.

A pull rope (80), of which one end is firmly fixed to the U-shaped adjustment rod (50) and then routed through against the roller wheels (64) and (54) of the handle mount (60) and the adjustment rod (50), respectively, and the opposite end is inserted into the pull handle (70).

Figure 5:
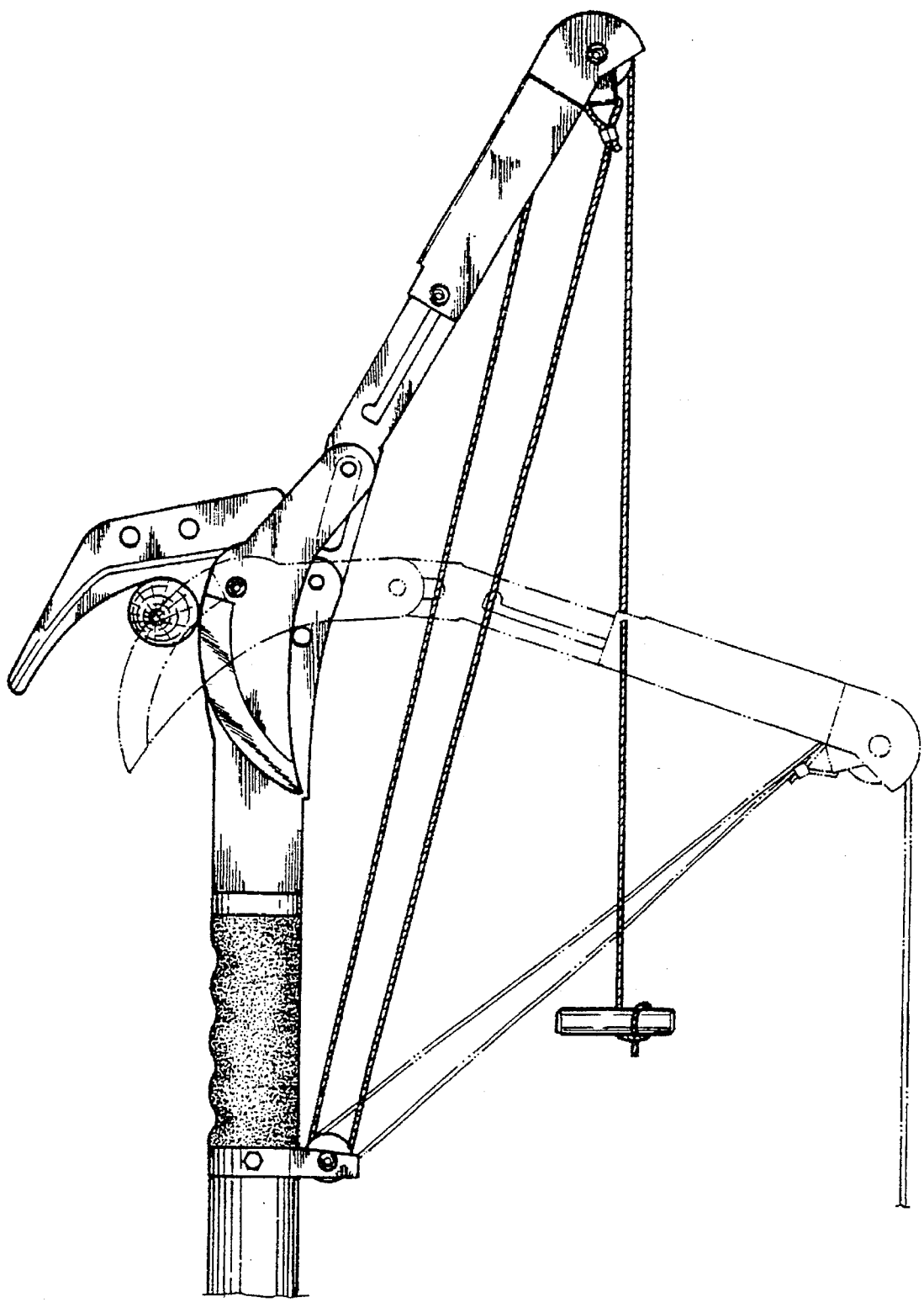
FIG. 5 is an orthographic drawing illustrating the second operational procedure in structural detail of the invention herein.

As indicated in FIG. 4 and FIG. 5, the operational descriptions of the aforesaid structural composition of the invention herein, when proceeding to prune tree branches, one hand grasps the lower extent of the extension rod (65) and the other hand tugs the pull handle (70) on the pull rope (80), whereupon the concave blade (8) is first positioned on the tree branch to be pruned, after which the pull rope (80) is drawn downward, thereby subjecting the adjustment rod (50) to a downward force that causes the movement of the pull rod (40) and initiates the consequent pivoting of the convex blade (30) at the hinged juncture on the shears (20), following which the convex blade (30) completes the pruning of the tree branch.

Figure 6:
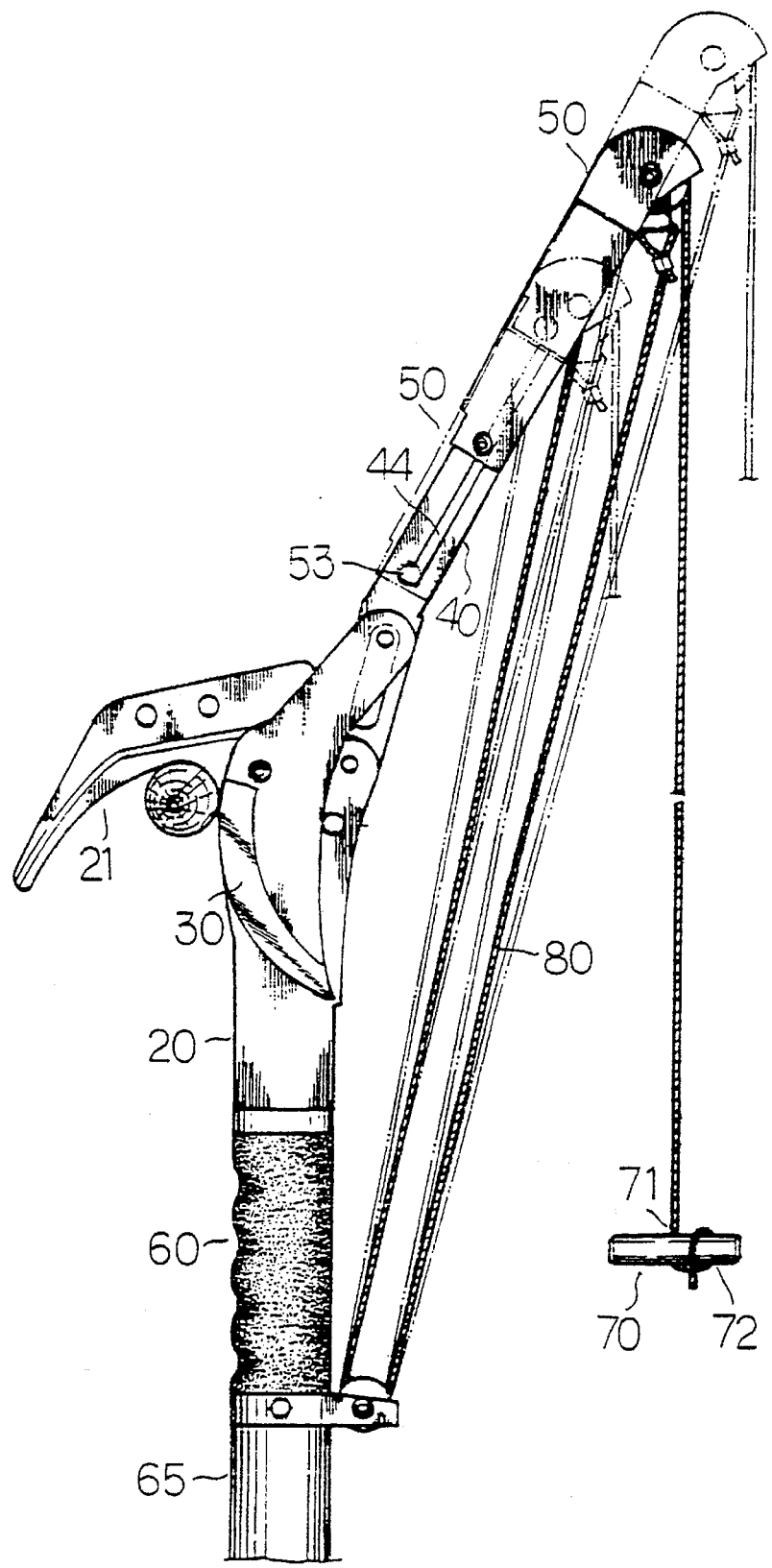
FIG. 6 is an orthographic drawing depicting the movement of the adjustable rod of the invention herein.

Furthermore, in the event that a coarse tree branch is encountered during the pruning operation that cannot be pruned (Referring now to the function of the adjustment rod depicted in FIG. 6.), the pull rod (40) that pivots on the shears (20) is brought into utilization, wherein the adjustment rod (50) is raised higher in the adjustment slot (44) within the pull rod (40) which causes the rearward movement of the positioner pin (53) and consequent slide into the next lower notch hole (45) to achieve a greater shearing force and thereby effectively maximizing pruning efficiency and, furthermore, resulting in pruning tool that requires minimum physical effort during the trimming of tree branches.

However, as indicated in FIG. 2, when the aforementioned tree branch to be pruned is off excessively large diameter as positioned against the convex blade (30) of the shears (20), then the saw blade (90) on the fastening pin (25) positioned at the upper extent of the concave blade (21) is prepared for utilization, wherein the retaining wing nut of the saw blade (90) is tightened to secure the saw blade (90) so that coarse tree branches (trunks) can be efficiently cut. Furthermore, after the completion of cutting a coarse tree branch (trunk), can be placed under the extension rod (65) of the shears (20), wherein due to the design of the handle mount (60) at the lower end of the shears (20) provides the user with an exception handle section that includes and holds a suitable saw blade for priming tree branches (trunks) that significantly increases the practical effectiveness of high branch pruning shears, Referring now to the pull handle illustrated in FIG. 4., the structure of the aforesaid pull handle (70) includes the two insertion holes (71) and (72), wherein after the aforesaid pull rope (80) is inserted through the insertion hole (71) in the pull handle (70) and the pull rope (80) is then inserted into the insertion hole (72) of the aforesaid pull handle (70), the insertion results in the formation of a semi-circular knot around the pull handle (70), which is then tightened into a fixed position through tension, and when the length of the pull rope (80) requires adjustment, the length of the pull rope (80) can be varied after the aforesaid knot is loosened, which thereby provides for a pull rope (80) that can be freely adjusted in length as necessary.

In summation of the foregoing description, the invention herein improves upon the broad range of shortcomings common to all conventional high branch pruning shears and, furthermore, the structural composition of the invention herein in terms of efficiency and practical effectiveness features simplicity and innovation and, therefore, is in compliance with new patent fight application requirements and is hereby submitted for evaluation pursuant to the awarding of the commensurate patent rights in accordance with the relevant laws.

What is claimed is:

1. An improved pruning apparatus, comprising:

a first member having a concave blade portion and a handle portion;

a second member having a convex blade portion, an intermediate portion, and an extended portion, said intermediate portion of said second member being pivotally mounted to said first member;

a pull rod having a slide slot and an adjustment slot defined therethrough, an end of said pull rod being pivotally mounted to said first member and said extended portion of said second member being slidably joined to said slide slot;

an adjustment rod having a substantially U-shaped section, a first end and a second end, said first end of said adjustment rod adjustably joined to said adjustment slot of said pull rod;

a spring biasing said pull rod away from said handle portion of said first member;

a first roller wheel rotatably mounted to said second end of said adjustment rod;

a second roller wheel rotatably mounted to said first member; and a pull rope having an end fixed to said second end of said adjustment rod, a portion engaging said second roller wheel, a portion engaging said first roller wheel and a free end;

wherein, manipulation of said pull rope forces said convex blade portion to converge on said concave blade portion and provides a cutting force thereby, and said adjustable rod is extendable or retractable along said pull rod to increase or decrease said cutting force between said concave blade portion and said convex blade portion.

2. An improved pruning apparatus as defined in claim 1, wherein:

said adjustment slot further includes a plurality of notches defined in a peripheral surface thereof.

3. An improved pruning apparatus as defined in claim 2, further comprising:

a positioner pin, said positioner pin fixed in said first end of said adjustment rod and releasably securable with one of said notches.

4. An improved pruning apparatus as defined in claim 1, further comprising:

a grip section having wave-like contours circumferencially engaging said handle portion.

5. An improved pruning apparatus as defined in claim 1, further comprising:

a pull handle having two insertion holes defined therethrough for adjustably engaging said free end of said pull rope.

6. An improved pruning apparatus as defined in claim 1, further comprising: an elongated extension handle connected to said handle portion for increasing a length of said handle portion.

7. An improved pruning apparatus as defined in claim 1, further comprising:

a saw blade extending from said first member.

* * * * *